US009633494B1

(12) United States Patent
Sun et al.

(10) Patent No.: US 9,633,494 B1
(45) Date of Patent: Apr. 25, 2017

(54) SECURE DESTRUCTION OF STORAGE DEVICES

(71) Applicant: Amazon Technologies, Inc., Seattle, WA (US)

(72) Inventors: Liang Sun, Beijing (CN); Jianfei Liu, Beijing (CN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/955,346

(22) Filed: Dec. 1, 2015

(51) Int. Cl.
*G05B 19/00* (2006.01)
*G07C 9/00* (2006.01)
*G06K 7/10* (2006.01)

(52) U.S. Cl.
CPC ..... *G07C 9/00007* (2013.01); *G06K 7/10366* (2013.01)

(58) Field of Classification Search
CPC .......................... G07C 9/00007; G06K 7/10366
USPC ... 340/5.61, 8.1, 691.5, 10.1, 572.1, 539.13, 340/539.12; 455/41.2; 705/2, 57, 318; 726/26, 34
See application file for complete search history.

(56) References Cited

U.S. PATENT DOCUMENTS 9,430,654 B1* 8/2016 Rajaie .................... B02C 25/00
2015/0339497 A1* 11/2015 Kurian ................... G06F 21/78
726/34

\* cited by examiner

*Primary Examiner* — Dhaval Patel
(74) *Attorney, Agent, or Firm* — Kilpatrick Townsend & Stockton LLP

(57) ABSTRACT

Techniques are provided for securely destroying storage devices stored in a data storage center. A server room may be situated in the data storage center that is configured to store a plurality of server racks for storing storage devices that are associated with a radio frequency identifier tag. The data storage center may include a secure area that includes destruction devices for destroying a storage. The data storage center may include a computer system for transmitting instructions to a user device for identifying the storage device for removal and transfer to the secure area, tracking a location of the storage device based at least in part on an associated RFID tag, and transmitting an alarm to the data storage center based at least in part on the location of the storage device and the expiration of a time interval.

19 Claims, 8 Drawing Sheets

SECURE DESTRUCTION OF STORAGE DEVICES

BACKGROUND

As computing devices continue to advance in processing power, data access speed, and mobility, so too must associated storage devices advance to maintain the status quo. For example, storage devices have become physically smaller and yet are able to store even more data than predecessor storage technology devices. Further, online marketplaces have allowed a number of consumers to purchase additional storage provided by large data centers that include multiple storage devices. However, the privacy of data maintained by the multiple storage devices in the large data centers must be ensured to provide an enhanced storage experience for the consumers.

BRIEF DESCRIPTION OF THE DRAWINGS

Various embodiments in accordance with the present disclosure will be described with reference to the drawings, in which.

DETAILED DESCRIPTION

Figure 1:
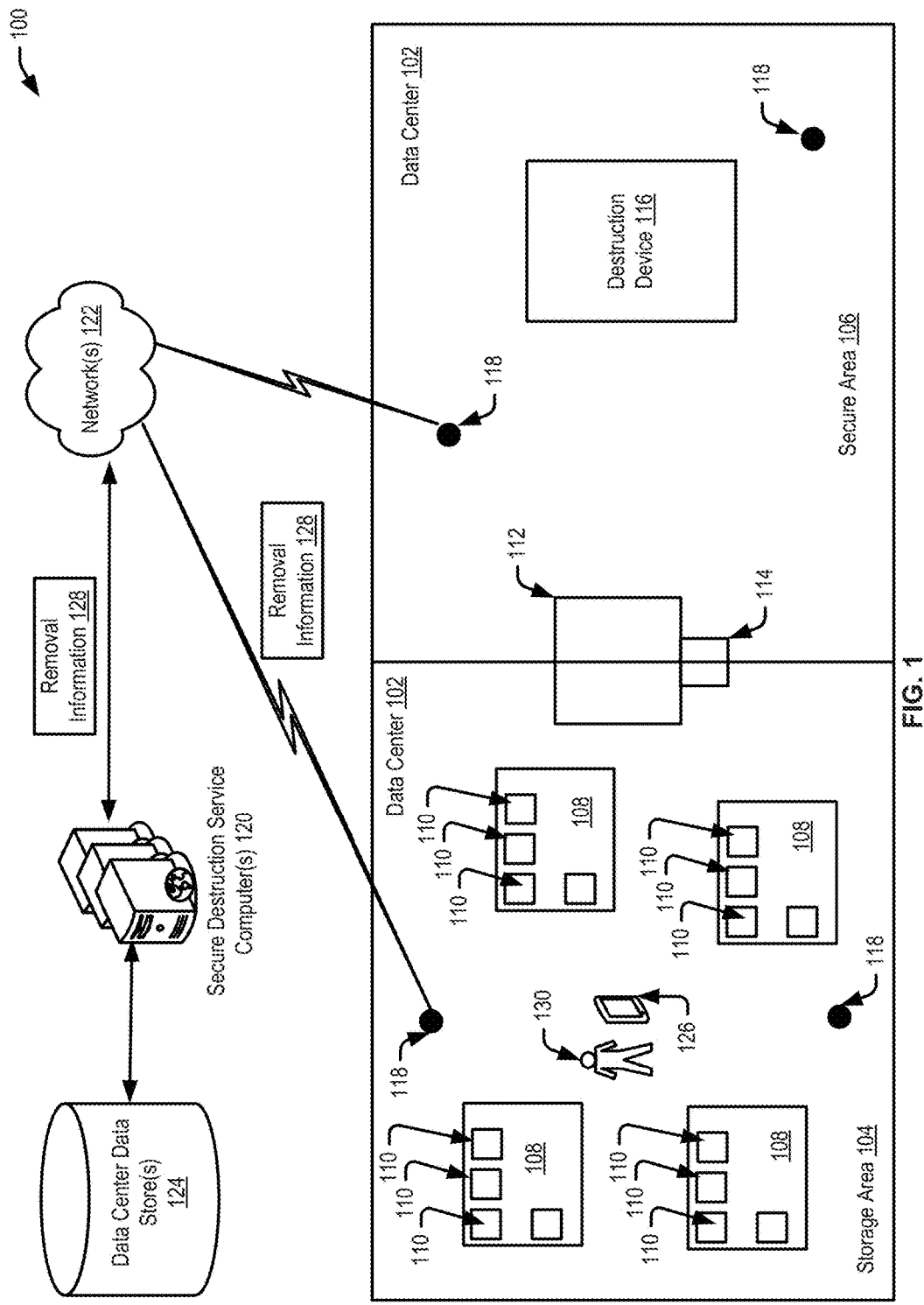
FIG. 1 illustrates an example data flow for a secure destruction feature for a storage device, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing a secure destruction feature for storage devices to securely destroy storage devices in a data storage center. In some examples, a data storage center may include a storage area that includes one or more server racks that store a plurality of storage devices. The storage devices may be associated with an electronic marketplace or other suitable entity for storing data on behalf of users, customers, and entities. The storage devices may be configured to provide scalable data storage capacity for information generated or provided by the users, customers, or entities. In embodiments, the data storage center may include a secure area that includes a destruction device for destroying storage devices. The storage devices can include, for example, hard drives, solid-state drives (SSDs), other devices, or a combination of any of these.

Access to and from the secure area may be enabled by a machine readable identifier reader such as an identification (ID) badge reader for interacting with ID badges associated with a technician of the data storage center. The badges can have various form factors, including a card, a fob, a button, a pin, or other form factors. A computer system that implements the secure destruction feature may maintain information that indicates the condition of the storage devices including active healthy devices that are performing properly and unhealthy, disabled, or defective devices that are not performing or not performing properly. In an embodiment, each storage devices may be associated with a radio frequency identifier (RFID) tag. The RFID tag may be associated with computational resources such as processors and memory for receiving and processing data signals or information provided by the computer system. The RFID tag may be associated with global positioning satellite (GPS) capabilities for determining the location of a particular storage device within the data storage center. In accordance with at least one embodiment, instructions may be generated and transmitted by the computer system to a technician's user device for identifying a storage device for removal and transfer to the secure area of the data storage center. The technician may be given a certain time period to enter the secure area and destroy the storage device via the destruction device before an alarm is triggered.

In a non-limiting example, a computer system implementing the secure destruction feature for a storage device, may identify a particular storage device stored in the storage area of a data storage center for removal and transfer to the secure area. The computer system may identify the particular storage device based on information that includes the health and/or condition of the particular storage device. For example, the information may indicate that several sectors of the particular storage device are malfunctioning and not storing data properly. The computer system may provide instructions to a technician, via a user device, to remove and transfer the particular storage device to the secure area within a particular time period. For example, the computer system may determine that the technician has fifteen minutes to transfer the particular storage device to the secure area and destroy the storage device before an alarm is issued. The computer system may determine the location of and track the particular storage device based on the associated RFID tag. For example, the data storage center may be outfitted with a plurality of RFID tag readers that can properly identify and mark the location of the RFID tag associated with the particular storage device. Upon receiving information identifying that the technician has entered the secure area the computer system may provide instructions to an ID badge reader that prevents the interaction of the technician ID badge with the ID badge reader thereby preventing the technician from leaving the secure area. In some examples, the destruction device is configured to provide information indicating that the particular storage device and its associated RFID tag are destroyed. In response to receiving the information indicating that the storage device is destroyed, the computer system may provide further instructions that enable the technician to interact with the ID badge reader and leave the secure area.

In accordance with at least one embodiment, the data storage center may include one or more wireless data access points for transmitting information between RFID tags, user devices of technicians, and machine readable identifier devices (such as ID badge readers). The wireless data access points may be one example of components for a communication network associated with the data storage center for transmitting information to and from the computer system implementing the features described herein. In an embodiment, the computer system may track and determine the location of each storage device stored in the data storage center based on periodic ping operations, over the available communication network, to each storage devices associated RFID tag. The computer system may maintain and utilize a mapping between each issued RFID tag and storage device to uniquely identify each storage device within the data storage center. In some examples, each reporting entity in the location or tracking operation may be associated with a unique identifier that can be utilized by the computer system to determine the last known location of a storage device and the associated RFID tag.

In some embodiments, the computer system may generate and associate a certain time period for the removal, transfer, and destruction of a storage device within the data storage center. Example time periods can include five minutes to fifteen minutes depending on the type of storage device and the size of the data storage center. The computer system implementing the secure destruction feature may generate and transmit an alarm based at least in part on the determined location of a storage device and the expiration of the certain time period for the storage device. The alarm may be transmitted to user devices of other technicians within the data storage center or to audio and visual components within the data storage center for presenting the alarm to the technicians. For example, the alarm may be an audio message that identifies the last known location of the storage device and RFID tag and the identity of the technician that removed the device. The computer system may generate and provide instructions to replace and initialize a new storage device for the removed and destroyed storage device. The computer system may generate an association between an RFID tag and the new storage device and update the association and condition information for each storage device in the data storage center. Although the specification usually refers to RFID tags, other technologies, such as near-field communication (NFC) tags, can also be used with any of the disclosed embodiments.

FIG. 1 illustrates an example data flow 100 for a secure destruction feature for a storage device, according to embodiments. The data flow 100 of FIG. 1 may include an example data center 102 comprised of a storage area 104 and a secure area 106. The storage area 104 may include one or more server racks 108 that store a plurality of storage devices 110. Access between the storage area 104 and secure area 106 may be through a door 112 that is associated with an ID badge reader 114 and opens upon interaction via an ID badge. In embodiments, the secure area 106 may include a destruction device 116 for degaussing and physically shredding storage devices and associated RFID tags. In some embodiments, the data center 102 may include one or more wireless access points 118 for transmitting information from components of the data center 102 to secure destruction service computers 120 via a network 122. As described herein, the secure destruction service computers 120 may implement the secure destruction features for storage devices. The secure destruction service computers 120 may maintain, update, and generate information, signals, and process indications for multiple components in the data centers 102 such as condition information for the storage devices 110, RFID to storage device associations, ID badge active or de-active states for interacting with the badge ID reader 114, time period information and generation, alarm information and generation, and removal and transfer instructions for a storage device 110.

In accordance with at least one embodiment, the secure destruction service computers 120 may maintain a variety of information in one or more data center data stores 124. In some embodiments, the datacenter 102 may include additional or fewer components than those illustrated in FIG. 1. For example, the number of server racks 108 and destruction devices 116 may vary substantially; there may be no wireless access points 118 and so forth. Typically, components of the data center 102 are located in a single building or connected buildings, but one or more of the components, such as the secure destruction service computers 120 and/or the user device 126, can be located remote of the data center 102 building complex and can be accessed remotely via the network 122. In an embodiment, the secure destruction service computers 120 may generate removal information 128 that identifies a storage device 110 for removal and transfer to the secure area 106 and eventual destruction by the destruction device 116. The generation of the removal information 128 may be based at least in part on information indicating the health or status of the storage device 110. For example, the status information for the storage device 110 may identify that the storage device 110 includes multiple bad sectors or that the storage device 110 is not performing optimally according to data access metrics. The removal information 128 may be provided to a user device 126 of a technician 130 that is associated with the data center 102. As described below, the technician 130 may remove the storage device 110 and transfer the storage device to the secure area 106 for sanitization that involves, for example, wiping the storage device 110 clean (degaussing) and/or destroying the storage device 110 (shredding).

Figure 2:
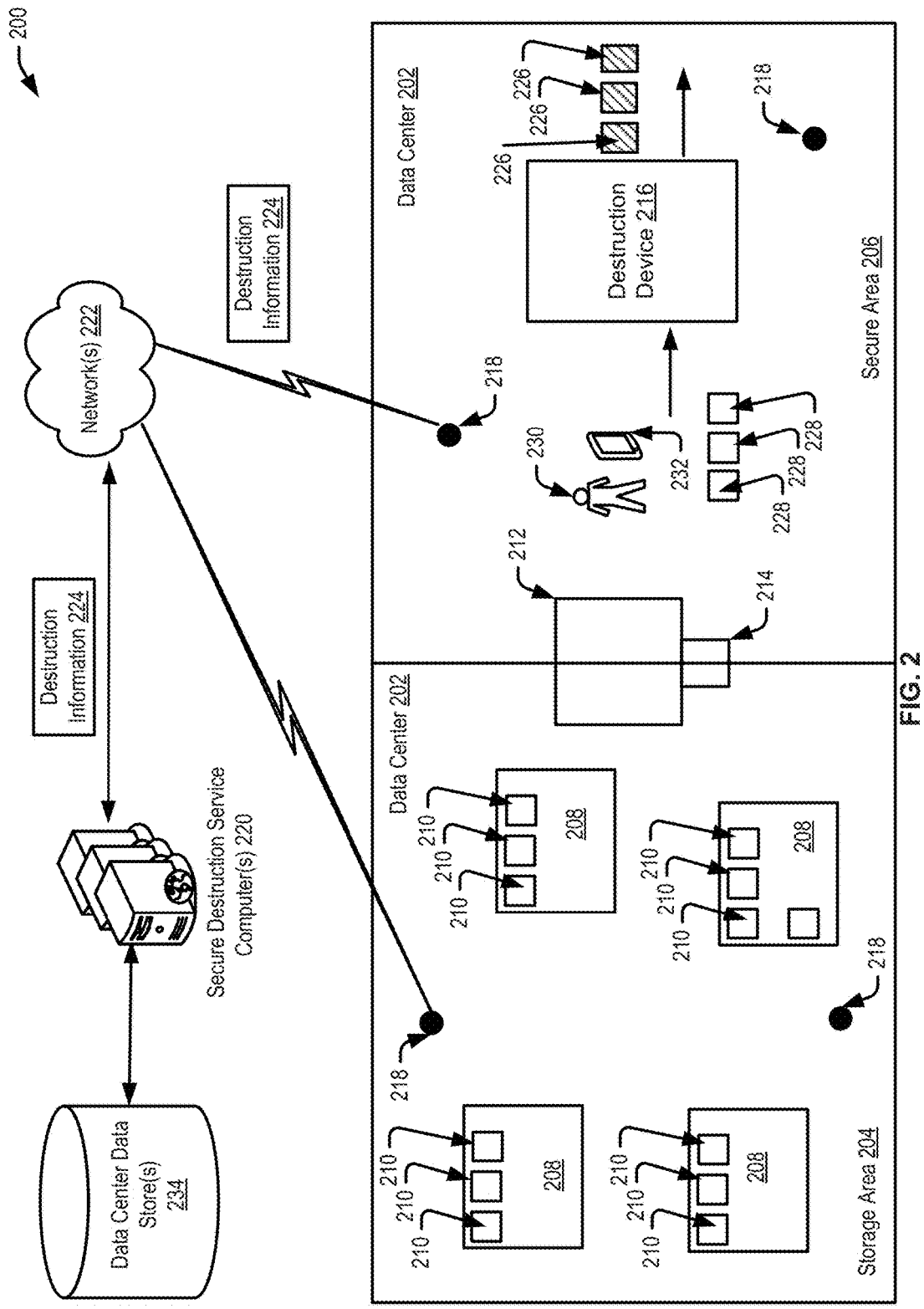
FIG. 2 illustrates an example data flow for a secure destruction feature for a storage device, according to embodiments.

FIG. 2 illustrates an example data flow 200 for a secure destruction feature for a storage device, according to embodiments. The data flow 200 of FIG. 2 may include an example data center 202 comprised of a storage area 204 and a secure area 206. The storage area 204 may include one or more server racks 208 that store a plurality of storage devices 210. Access between the storage area 204 and secure area 206 may be through a door 212 that is associated with an ID badge reader 214 and opens upon interaction via an ID badge. In various embodiments, access between the storage area 204 and secure area 206 may be through a door 212 that is associated with an access-control device. The access-control device may be in communication with an access-control system that is implemented by the secure destruction service computers 220. An access-control device may be an ID badge reader, another identification reader such as a BlueTooth or NFC chip reader, or a biometric authenticator device (e.g., fingerprint authentication, visual authentication, voice authentication). In some embodiments, the secure area 206 may include a destruction device 216 for degaussing and/or physically shredding storage devices and associated RFID tags. In some embodiments, the data center 202 may include one or more wireless access points 218 for transmitting information to and from components of the data center 202 to secure destruction service computers 220 via a network 222. As described herein, the secure destruction service computers 220 may implement the secure destruction features for storage devices.

The secure destruction service computers 220 may maintain, update, and generate information, signals, and process indications for multiple components in the data centers 202.

For example, the secure destruction service computers 220 may receive information 224 from the destruction device 216 and from the RFID tags for destroyed storage devices 226 upon the destruction of storage devices 228, which were removed from the storage area 204 by a technician 230. As described herein, instructions may have been transmitted to a user device 232 associated with technician 230 that identify the storage devices 228 for removal from the storage area 204 and destruction via the destruction device 216. In some embodiments the technician 230 may utilize the user device 232 to interact with the RFID tags of storage devices 228 to provide location information to the secure destruction service computers 220 and to indicate that the storage devices 228 are going to be imminently destroyed.

In an embodiment, the destruction device 216 may be configured to receive a storage device 228 with the associated RFID tag. If the RFID tag is absent from the storage device 228, the destruction device 216 provides information indicating this absence which can result in an alarm being issued to the data center 202. In accordance with at least one embodiment, the technician 230 when transferring the storage devices 228 from the storage area 204 to the secure area 206 may interact with the ID badge reader 214 of door 212 to gain access to the secure area 206. In various embodiments, information that identifies entry or access, via the ID badge reader 214 and door 212, by a technician 230 may be provided, via the network 222, to the secure destruction service computers 220. In response to receiving the door access information, the secure destruction service computers 220 may generate and transmit instructions or a signal that prevents the technician 230 from interacting with the ID badge reader 214 and leaving the secure area 206.

The secure destruction service computers 220 may provide additional information or instructions to the ID badge reader 214 and suitable components to enable the technician to interact with the ID badge reader again in response to receiving the destruction information 224. Disabling the ID badge reader from reading or interacting with an ID badge of the technician 230 upon entry to the secure area 206 ensures that the technician 230 follows protocol and destroys the appropriate storage devices 228 within a certain time period as described herein. By tracking the location of the storage devices 210 and 228, associating a time period with removal instructions, and preventing the technician 230 from leaving the secure area 206 until destruction information 224 for the appropriate storage devices 228 is received, customers data and privacy is securely ensured and destroyed without data leaks or other inconsistencies that can be introduced by other data storage centers currently in use. In accordance with at least one embodiment, the ID badge reader 214 and/or an access-control system may be configured to not open the door 212 until an appropriate time (e.g., when the technician 230 is permitted to leave or enter the secure area 206). In such embodiments, the ID badge reader 214 and/or access-control system may still interact and/or read the ID badge or other forms of identification without being disabled. In particular embodiments, the technician 230 may be allowed to leave the secure area 206 before destruction is complete (e.g., before the destruction information 224 is provided to the secure destruction service computers 220) if there is a fire alarm or other emergency. Signals or instructions may be provided by the secure destruction service computers 220 to the ID badge reader 214 enabling the technician 230 to leave the secure area 206 based on a fire alarm or other emergency associated with the data center 202. In accordance with at least one embodiment, the secure destruction service computers 220 may maintain a variety of information in one or more data center data stores 234. In some embodiments, the datacenter 202 may include additional or fewer components than those illustrated in FIG. 2. It should be noted that although FIG. 2 illustrates a data center 202 with a separated storage area 204 and secure area 206, in various embodiments the data center 202 may be configured with the storage area 204 and secure area 206 being within the same area (e.g., the same room) of the data center 202. In addition, although some embodiments describe preventing the technician 230 from leaving the secure area 206, in some embodiments the technician may be prevented from leaving the storage area 204 with any storage devices 210. For example, access to the storage area 204 may be through one or more doors that are also configured to prevent the technician 230 from leaving the storage area or data center 204 until certain information is transmitted to the secure destruction service computers 220 or based on other conditions. For example, the technician 230 may be prevented from leaving the storage area 204 or data center 202 until certain storage devices 210 have been removed and/or destroyed according to the secure destruction service computers 220.

Figure 3:
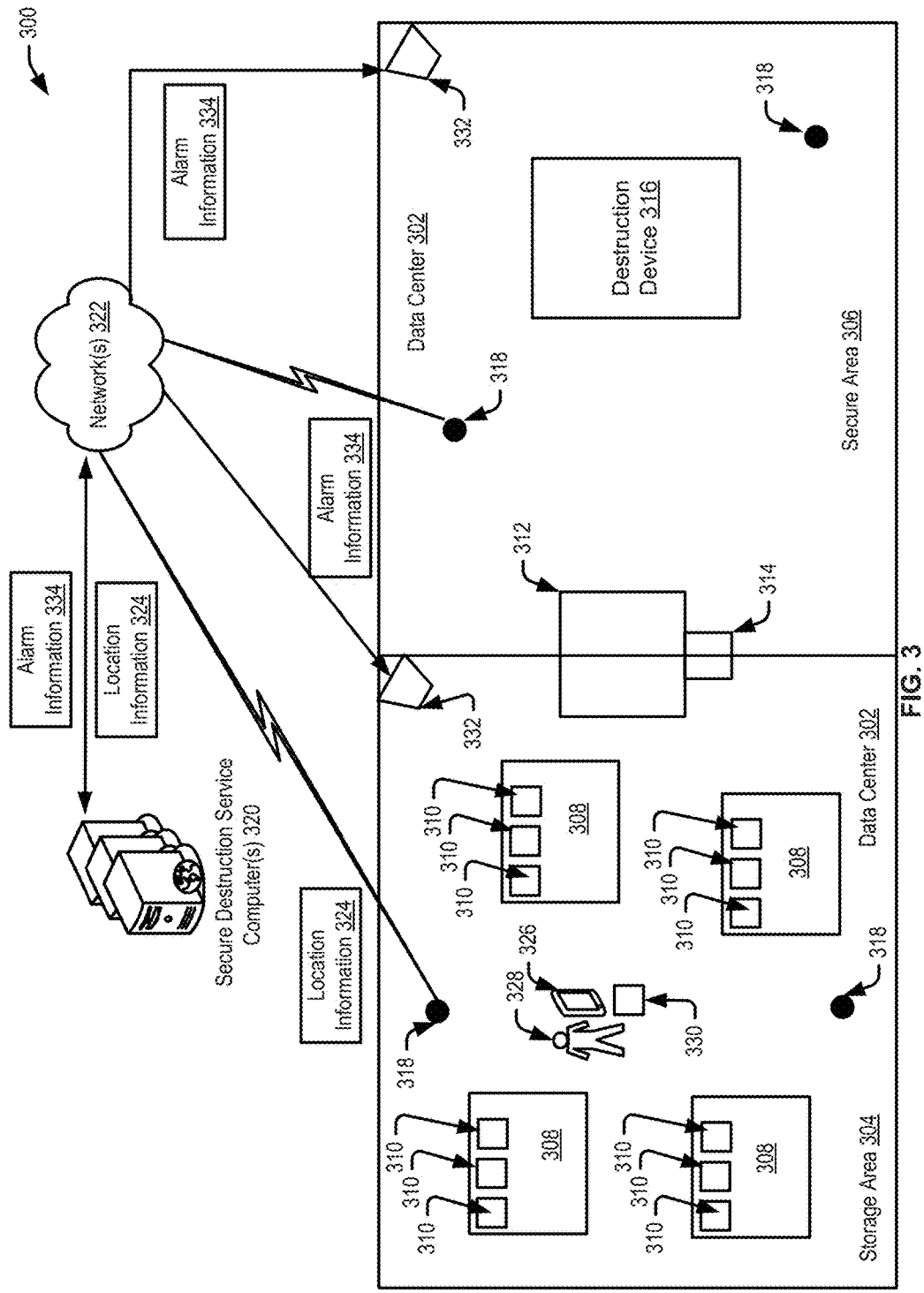
FIG. 3 illustrates an example data flow for a secure destruction feature for a storage device, according to embodiments.

FIG. 3 illustrates an example data flow 300 for a secure destruction feature for a storage device, according to some embodiments. The data flow 300 of FIG. 3 may include an example data center 302 comprised of a storage area 304 and a secure area 306. The storage area 304 may include one or more server racks 308 that store a plurality of storage devices 310. Access between the storage area 304 and secure area 306 may be through a door 312 that is associated with an ID badge reader 314 and opens upon interaction via an ID badge. In embodiments, the secure area 306 may include a destruction device 316 for degaussing and physically shredding storage devices and associated RFID tags. In some embodiments, the data center 302 may include one or more wireless access points 318 for transmitting information to and from components of the data center 302 to secure destruction service computers 320 via a network 322. As described herein, the secure destruction service computers 320 may implement the secure destruction features for storage devices.

The secure destruction service computers 320 may maintain, update, and generate information, signals, and process indications for multiple components in the data centers 302. For example, the secure destruction service computers 320 may receive location information 324 from the RFID tags associated with the storage devices 310 via the wireless access points 318 and network 322. As described herein, the location information 324 may be provided by computing components associated with the RFID tags of the storage devices 310, such as GPS components or using other indoor location systems. In some examples, the secure destruction service computers 320 may determine the location of a storage device 310 within the data center 302 by utilizing a mapping between a reporting component, such as a user device 326, wireless access point 318, or other suitable component, identification information for the reporting component, and information that identifies the location of the reporting component. In accordance with at least one embodiment, the secure destruction service computers 320 may generate and maintain a certain time period to associate with removal instructions transmitted to a technician 328. As described herein, the technician 328 has until expiration of the time period to remove and transfer a particular storage device 330 before an alarm is generated and provided to the data center 302.

For example, the secure destruction service computers 320 may have generated removal and transfer instructions for the storage device 330 and transmitted the instructions to the user device 326 associated with technician 328. To ensure that the technician 328 is following procedures to ensure data privacy and secure destruction, the technician 328 has until the expiration of a certain time period to transfer the storage device 330 to the secure area 306 and destroy the storage device 330 with the destruction device 316. The transmittal of destruction information from the destruction device 316 to the secure destruction service computers 320 may be utilized to prevent the provisioning of an alarm. In embodiments, the data center 302 may include one or more alarm components 332. As described herein, if the technician 328 has not destroyed the storage device 330 by the expiration of the certain time period, the secure destruction service computers 320 may generate and provide alarm information 334 to the alarm components 332. The alarm components 332 may provide a visual and/or audio alarm that informs entities associated with the data center 302 of the location of the storage device 330 and the identity of the responsible technician 328. Additional security measures may be taken such as transmitting instructions to lock down the data center 302 until the storage device 330 has been properly located and destroyed.

As described herein, instructions may have been transmitted to a user device 232 associated with technician 230 that identify the storage devices 228 for removal from the storage area 204 and destruction via the destruction device 216.

Figure 4:
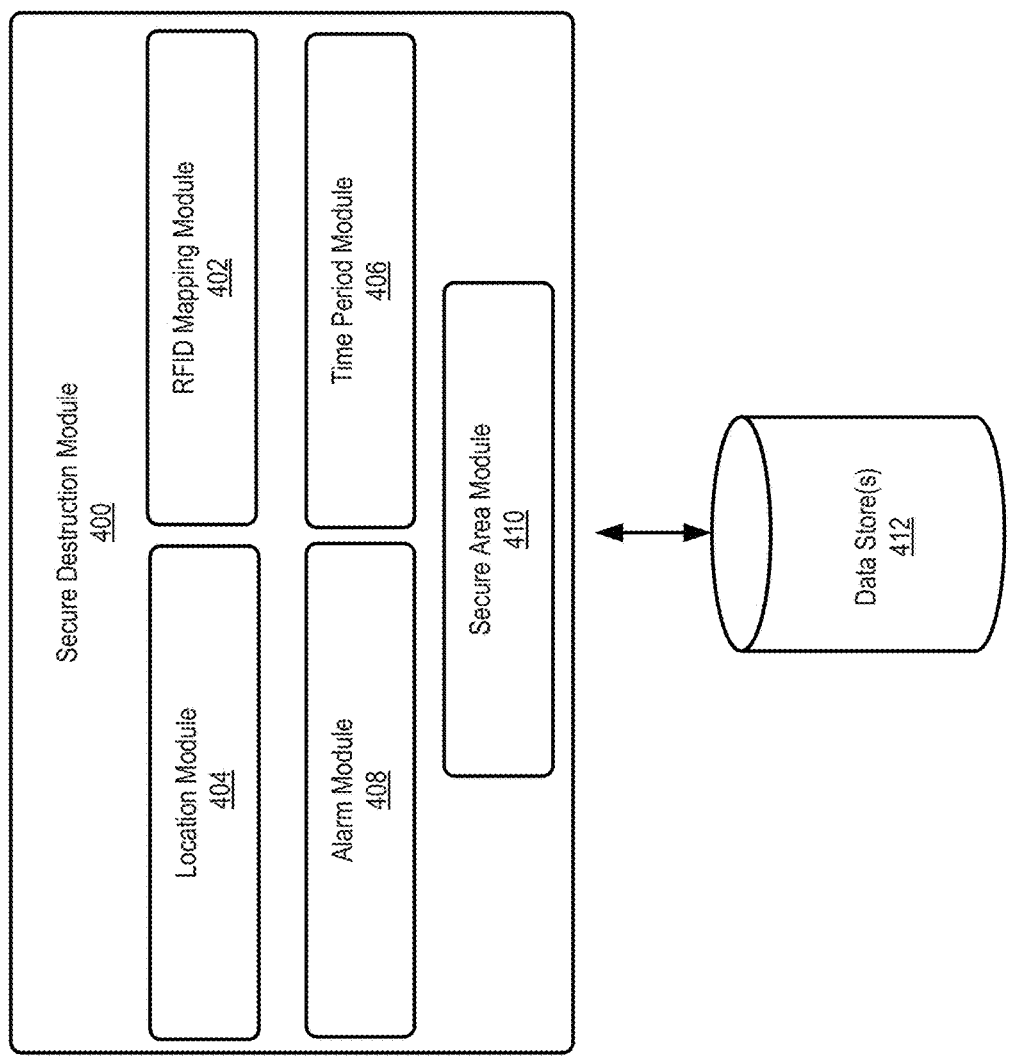
FIG. 4 illustrates an example secure destruction module, according to embodiments.

FIG. 4 illustrates an example secure destruction module 400, according to some embodiments. In accordance with at least one embodiment, the secure destruction module 400 may include an RFID mapping module 402, a location module 404, a time period module 406, an alarm module 408, and a secure area module 410 that is in communication with one or more data stores 412. The modules included within and including the secure erase module 400 may be software modules, hardware modules or a suitable combination thereof. If the modules are software modules, the modules can be embodied on a non-transitory computer readable medium and processed by a processor in any of the computer systems described herein. It should be noted that the described processes and architectures described below can be performed either in real-time or in an asynchronous mode prior to any user interaction. The modules may be configured in the manner suggested in FIG. 4 or may exist as separate modules. The secure destruction module 400 may be implemented by the secure destruction service computers of FIGS. 1-3 (e.g., 120, 220, and/or 320).

In accordance with at least one embodiment, the secure destruction module 400 may be configured to maintain information indicating the health, status, or condition of storage devices in a data storage center/storage center. For example, the secure destruction module 400 may perform periodic requests for status information for each storage device in the data storage center. Each storage device may be configured to run an application or diagnostic application that can provide the status or condition information for the storage device to the secure destruction module 400. In some embodiments, the secure destruction module 400 may determine the status, health, or condition of a particular storage device by tracking, maintaining, and analyzing metrics associated with data access requests. For example, speed of read/write operations, network connectivity, power consumption, or any other suitable performance indication metric. In an embodiment, the secure destruction module 400 may identify a storage device for removal, transfer, and destruction based at least in part on the information indicating the condition of the storage device. Storage devices that are determined to be performing non-optimally, are diagnosed with defects, or contain one or more defective sectors, may be selected for removal, transfer, and destruction. The secure destruction module 400 may provide the instructions to a computer or user device of a technician that identifies the particular storage device for removal and sanitization. In some embodiment, the secure destruction module 400 may transmit instructions for replacing the removed storage device with a new storage device that is associated with an RFID tag as discussed herein.

In accordance with at least one embodiment, the RFID mapping module 402 is configured to maintain information that identifies a mapping between an RFID tag and a storage device in the data storage center. The mapping may identify a one to one relationship between an RFID tag and a storage device thus indicating a unique relationship for each pairing. The RFID mapping module 402 may updating the mapping information in response to a destruction signal from a destruction device as described herein such as by removing the mapping. In particular embodiments, the RFID mapping module 402 may be configured to add new mapping information for a replacement storage device that is implemented in the data storage center.

In accordance with at least one embodiment, the location module 404 may be configured to determine the location of a storage device and associated RFID tag based at least in part on location information either provided by or derived from the RFID tag in the data storage center as described herein. In embodiments, the location module 404 may track the location of the storage device and RFID tag by making periodic requests for or receiving location information that indicates or identifies the location in the data storage center of the storage device and RFID tag. In some examples, the location module 404 may maintain and update a last known location for a storage device and RFID tag that have been identified for removal, transfer, and destruction. The location module 404 may cease tracking or updating the last known location upon receiving information or data indicating that the storage device and RFID tag are destroyed.

In accordance with at least one embodiment, the time period module 406 may be configured to generate a time period to associate with instructions to remove, transfer, and destroy a particular storage device in a data storage center. The time period may be utilized by the alarm module 408 to generate an alarm. For example, upon expiration of the time period, if information indicating that the identified storage device and RFID tag are destroyed has not been received, an alarm may be generated. The time period module 406 may be configured to receive the destruction information and cease tracking the expiration of the time period or cease from counting down until alarm generation. In some embodiments, the time period module 406 may generate varying time periods (e.g., one minute, five minutes, fifteen minutes, etc.,) based on the type of data stored on the storage device, the location of the storage device in the data storage center, or other policies that are maintained by the secure destruction module 400 that indicate time periods to associate with a storage device removal instructions.

In accordance with at least one embodiment, the alarm module 408 may be configured to generate and transmit an alarm upon expiration of the time period provided by the time period module 406. The alarm module 408 may generate an audio, visual, or other suitable alarm that can be provided to various components of the data storage center for alerting entities, such as technicians, of the failure to destroy an identified storage device within the certain time period. In some embodiments, the alarm may include information that identifies the last known location of the storage device and associated RFID tag, the identity of the technician that removed the storage device or was granted access to the secure area, or other suitable information for alerting entities associated with the data storage center about the failure to follow removal and destruction protocols.

In accordance with at least one embodiment, the secure area module 410 may be configured to receive and process information transmitted from destruction devices in a secure area of a data storage center. For example, information identifying the destruction and sanitization of storage devices that were selected for removal, transfer, and destruction may be received by a destruction device and utilized to cease counting down of a time period by the time period module 406 or stop an alarm generated by the alarm module 408. In embodiments, the secure area module 410 may be configured to receive, transmit to and from, and process information and data signals from an ID badge reader that is associated with a door that grants access to and from the secure area of a data storage center. The secure area module 410 may be configured to provide information and/or instructions to the ID badge reader to grant access to or prevent access to the secure area of the data storage center as described herein. For example, the secure area module 410 may maintain and update information that indicates whitelisted and blacklisted entities and associated ID badges or other suitable machine readable identifiers that may or may not interact with the ID badge reader. The secure area module 410 may be configured to receive information provided by a destruction device that verifies that identity of an appropriate storage device and RFID before proceeding with destruction of the storage device. The verification may be provided to the secure destruction module 400 to trigger the updating and generation of association mapping information for the RFID tag and storage devices.

Figure 5:
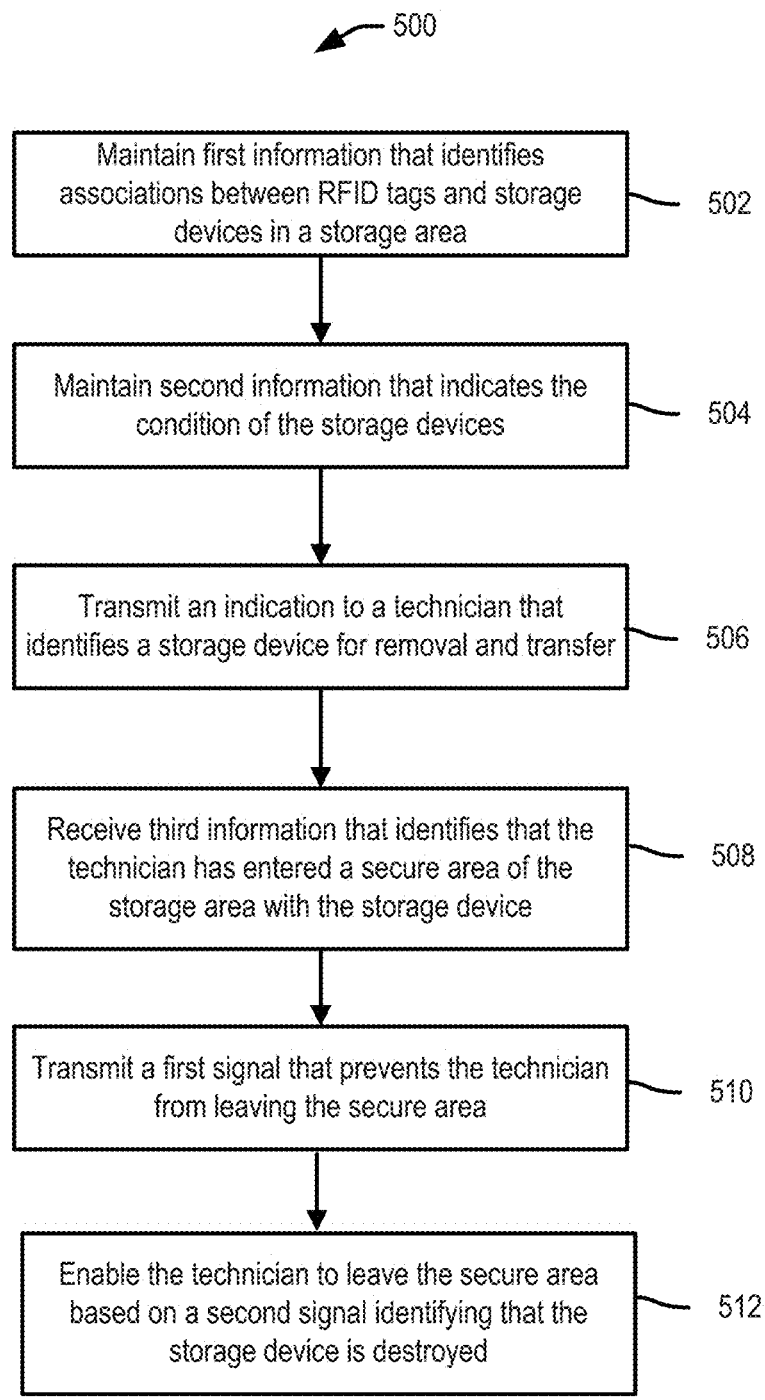
FIG. 5 illustrates an example flow diagram for a secure destruction feature for a storage device, according to embodiments.
Figure 6:
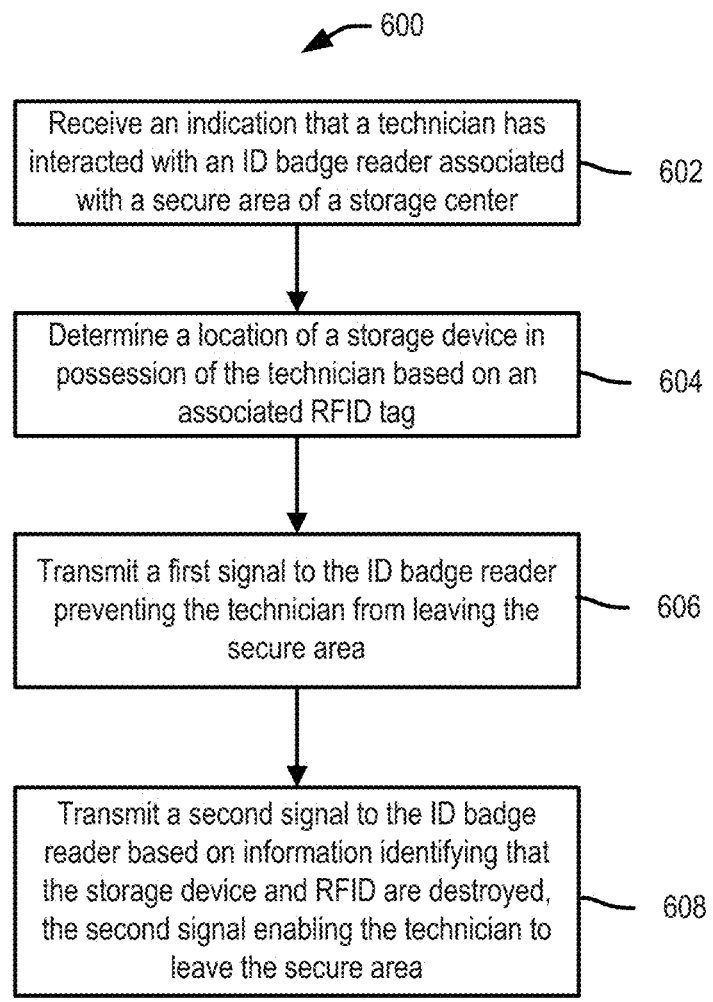
FIG. 6 illustrates an example flow diagram for a secure destruction feature for a storage device, according to embodiments.

FIGS. 5 and 6 illustrate example flow diagrams for a secure destruction feature for a storage device, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted below, the code may be stored on a computer-readable storage medium, for example, in the form of a computer program including a plurality of instructions executable one or more processors. The computer-readable storage medium may be non-transitory.

In some examples, one or more secure destruction service computers (e.g., utilizing at least one of a secure destruction module 400, an RFID mapping module 402, a location module 404, a time period module 406, an alarm module 408, and a secure area module 410 in communication with data stores 412) shown in FIG. 4 may perform the processes 500 and 600 of FIGS. 5 and 6. In FIG. 5, the process 500 may include maintaining first information that identifies associations between RFID tags and storage devices in a storage area at 502. As described herein, the secure destruction service computers may generate new associations between RFID tags and storage devices and remove associations between RFID tags and storage devices. The process 500 may include maintaining second information that indicates the condition of the storage devices at 504. For example, the one or more secure destruction service computers may maintain operation metrics or conditions for each storage device in a data storage center that indicates the health of the storage device. The process 500 may include transmitting an indication to a technician that identifies a storage device for removal and transfer at 506. In embodiments, a particular storage device in a data storage center may be identified and selected for removal and transfer to the secure area based at least in part on the second information that identifies the condition or status of the particular storage device. A storage device that is not performing optimally may be selected for removal and destruction as described herein.

The process 500 may include receiving third information that identifies that the technician has entered a secure area of the storage area with the identified storage device at 508. For example, access to the secure area of the data storage center may be enabled by a door that is associated with an ID badge reader. To gain access to the secure area a technician may be required to interact with the ID badge reader with their own personal ID badge. The process 500 may include transmitting a first signal that prevents the technician from leaving the secure area at 510. In embodiments, the one or more secure destruction computers may provide, via a data signal, instructions preventing the ID badge of the technician from interacting with the ID badge reader for the door that grants access to and from the secure area. This process is to ensure that the technician properly sanitizes and destroys the identified storage device according to policies maintained by the secure destruction computers. The process 500 may conclude at 512 by enabling the technician to leave the secure area based at least in part on a second signal identifying that the identified storage device is destroyed. For example, a destruction device of the secure are may be configured to transmit destruction information to the one or more secure destruction computers that indicate that the identified storage device has been destroyed. In response to receiving the destruction information, the one or more secure destruction computers may provide instructions that enable the technician to once again interact with the ID badge reader and leave the secure area.

In FIG. 6 the process 600 may include receiving an indication that a technician has interacted with an ID badge reader associated with a secure area of a storage center at 602. For example, the storage center may be configured to utilize an ID badge reader to grant physical access to and from a secure area of the storage center via a door that is associated with an ID badge reader. The ID badge reader may be configured to read/scan an ID badge of a technician and enable the technician to open the door of the secure area to grant access. The process 600 may include determining a location of a storage device (e.g., a storage device in possession of the technician) based on an associated RFID tag at 604. As described herein, a computer system implementing the secure destruction feature may receive location information, via wireless access points situated at different areas of the storage center. The location information may include an identifier for the reporting entity (user device of a technician, an RFID reader situated in the storage center, or a suitable RFID reader/scanner) and information that identifies the location such as GPS information.

The process 600 may include transmitting a first signal to the ID badge reader preventing the technician from leaving the secure area. For example, the first signal may prevent the technician from interacting with the ID badge reader at 606, or may instruct the badge reader to not unlock a door or gate for the technician. In some cases, the first signal may remove an association or mapping of the ID badge of the technician from a list of allowed ID badge readers that can interact with the ID badge reader. In some examples, the computer system may whitelist and blacklist certain ID badges, and the information of the whitelisted and blacklisted ID badges can be provided to the ID badge reader to grant or deny access to the secure area of a storage center. The process 600 may conclude at 608 by transmitting a second signal to the ID badge reader based on information identifying that the storage device and RFID are destroyed. In embodiments, the second signal may enable the technician to leave the secure area. In accordance with at least one embodiment, the information identifying that the storage device and associated RFID are destroyed may be transmitted by a destruction device within the secure area of the storage center.

Figure 7:
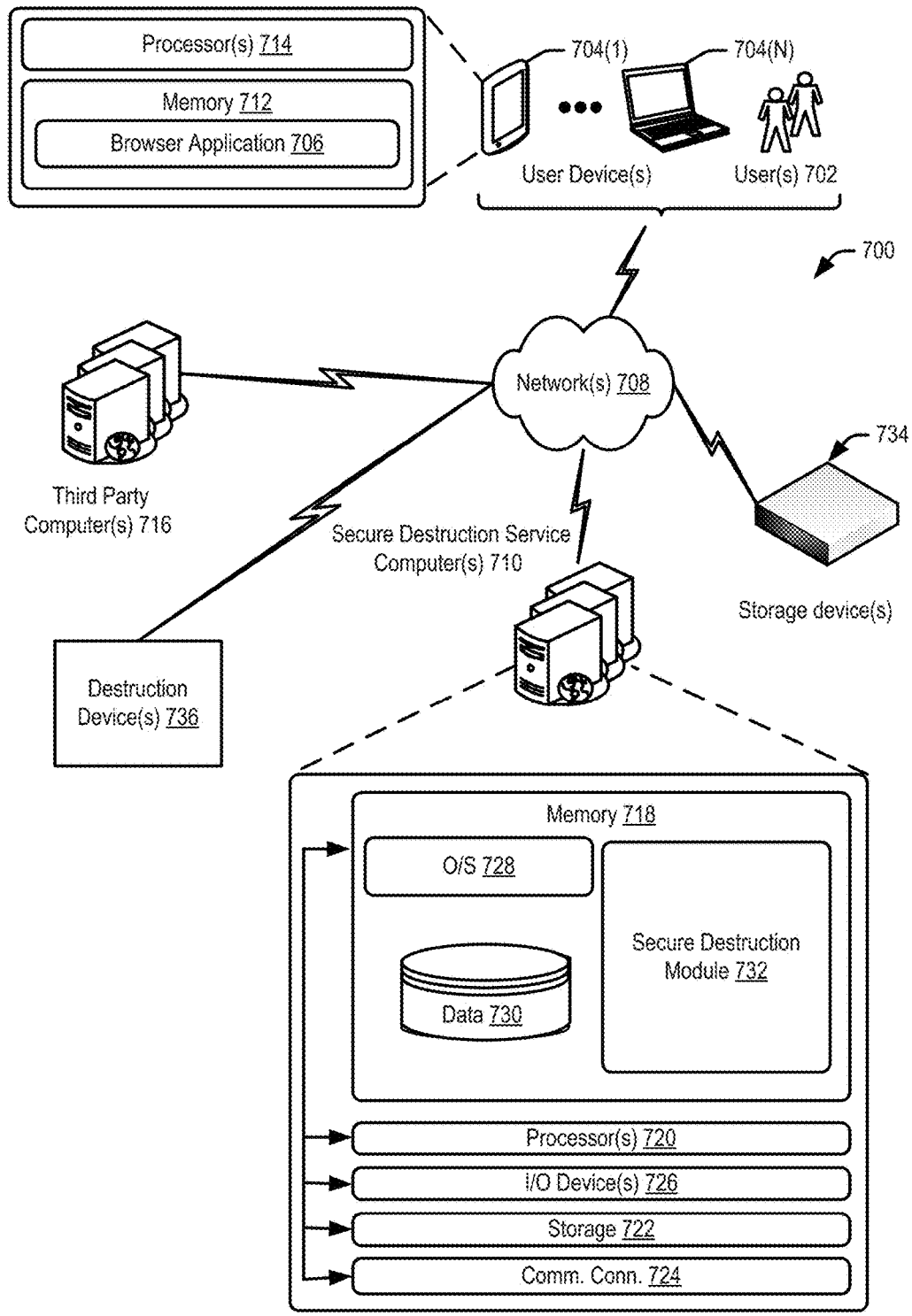
FIG. 7 illustrates an example computer architecture for implementing a secure destruction feature for a storage device, according to embodiments.

FIG. 7 illustrates an example computer architecture for implementing a secure destruction system for a storage device, according to some embodiments. In architecture 700, one or more users 702 (e.g., users) may utilize user computing devices 704(1)-(N) (collectively, user devices 704) to access a browser application 706 (e.g., a network document browser) or a user interface (UI) accessible through the browser application 706, via one or more networks 708 to receive and transmit information related to removing, transferring, and destroying identified storage devices in a storage center. The "browser application" 706 can be any suitable browser control or native application that can access and display a web page, information from secure destruction service computers 710, or other information. The "user devices" can include a tablet computer device, a mobile computing device, a mobile phone, a laptop, a desktop computer device, and/or a hand-held computer device. In some aspects, the browser application 706 may be utilized to transmit location information of a storage device and its associated RFID tag or interact with an ID badge reader for getting access to a secure area.

The architecture 700 may also include, one or more secure destruction service computers 710 that may, in some examples, provide computing resources such as, but not limited to, client entities, low latency data storage, durable data storage, data access, management, virtualization, hosted computing environment or "cloud-based" solutions, electronic content performance management, etc. The one or more secure destruction service computers 710 may also be operable to provide site hosting, computer application development, and/or implementation platforms, combinations of the foregoing, or the like to the one or more users 702.

In one illustrative configuration, the user devices 704 may include at least one memory 712 and one or more processing units or processor(s) 714. The processor(s) 714 may be implemented as appropriate in hardware, computer-executable instructions, firmware, or combinations thereof. Computer-executable instruction or firmware implementations of the processor(s) 714 may include computer-executable or machine-executable instructions written in any suitable programming language to perform the various functions described herein. The user devices 704 may also include geo-location devices (e.g., a global positioning system (GPS) device or the like) for providing and/or recording geographic location information associated with the user devices 704. The memory 712 may store program instructions that are loadable and executable on the processor(s) 714, as well as data generated during the execution of these programs. Depending on the configuration and type of user device 704, the memory 712 may be volatile (such as random access memory (RAM)) and/or non-volatile (such as read-only memory (ROM), flash memory, etc.). The user device 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 712 may include multiple different types of memory, such as static random access memory (SRAM), dynamic random access memory (DRAM), or ROM.

Turning to the components of the memory 712 in more detail, the memory 712 may include an operating system and one or more application programs or services for implementing the features disclosed herein including providing location information, receiving instructions for removal and transfer of a storage device, and interacting with components of the data center or data storage center as described herein. Additionally, the memory 712 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 702 provided response to a security question or a geographic location obtained by the user device 704.

In some examples, the networks 708 may include any one or a combination of many different types of networks, such as cable networks, the Internet, wireless networks, cellular networks and other private and/or public networks. While the illustrated example represents the users 702 communicating with secure destruction service computers 710 over the networks 708, the described techniques may equally apply in instances where the users 702 interact with the one or more secure destruction service computers 710 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The browser application 706 may be capable of handling requests from many users 702 and serving, in response, various user interfaces that can be rendered at the user devices 704 such as, but not limited to, a network site, application interface, application user interface, or web page. The browser application 706 can interact with any type of network site that supports user interaction, including social networking sites, electronic retailers, informational sites, blog sites, search engine sites, news and entertainment sites, electronic marketplaces, and so forth. The described techniques can similarly be implemented outside of the browser application 706, such as with other applications running on the user device 704. In some examples, the one or more secure destruction service computers 710 may communicate with one or more third party computers 716 to receive from and transmit to instructions for removing and transferring storage devices in a storage center and receiving information from and transmitting instructions to a technician or user associated with the third party computers 716 as described herein.

The one or more secure destruction service computers 710 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more secure destruction service computers 710 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more secure destruction service computers 710 may be in communication with the user device 704 via the networks 708, or via other network connections. The one or more secure destruction service computers 710 may include one or more servers, perhaps arranged in a cluster or as individual servers not associated with one another.

In one illustrative configuration, the one or more secure destruction service computers 710 may include at least one memory 718 and one or more processing units or processors (s) 720. The processor(s) 720 may be implemented as appropriate in hardware, computer-executable instructions, firmware, or combinations thereof. Computer-executable instruction or firmware implementations of the processor(s) 720 may include computer-executable or machine-executable instructions written in any suitable programming language to perform the various functions described when executed by a hardware computing device, such as a processor. The memory 718 may store program instructions that are loadable and executable on the processor(s) 720, as well as data generated during the execution of these programs. Depending on the configuration and type of the one or more secure destruction service computers 710, the memory 718 may be volatile (such as RAM) and/or non-volatile (such as ROM, flash memory, etc.). The one or more secure destruction service computers 710 or servers may also include additional storage 722, which may include removable storage and/or non-removable storage. The additional storage 722 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718, the additional storage 722, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 718 and the additional storage 722 are all examples of non-transitory computer storage media. Additional types of non-transitory computer storage media that may be present in the one or more secure destruction service computers 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more secure destruction service computers 710. Combinations of any of the above should also be included within the scope of non-transitory computer-readable media.

The one or more secure destruction service computers 710 may also contain communication connection interface(s) 724 that allow the one or more secure destruction service computers 710 to communicate with a data store, another computing device or server, user terminals and/or other devices on the networks 708. The one or more secure destruction service computers 710 may also include I/O device(s) 726, such as a keyboard, a mouse, a pen, a voice input device, a touch input device, a display, speakers, a printer, etc.

Turning to the contents of the memory 718 in more detail and as was described above in further detail in FIG. 4, the memory 718 may include an operating system 728, one or more data stores 730, and/or one or more application programs or services for implementing the features disclosed herein including a secure destruction module 832 (which may be an example of secure destruction module 400). In accordance with at least one embodiment, the secure destruction module 732 may be configured to maintain information that identifies a mapping between RFID tags and storage devices that are located in a data storage center, maintain information that indicates the health, condition, or status of the storage devices, determine and track the location of storage devices within the data storage center utilizing location information that may be provided or based on the associated RFID tags, transmit signals, information, or instructions to enable and/or prevent a technician for entering or leaving a secure area utilizing an ID badge reader that is associated with the secure area, and receive and transmit information to and from a destruction device in the secure area that is configured to sanitize (degauss) and destroy (physically shred) identified storage devices as described herein.

The secure destruction service computers 710 may be in communication with one or more storage devices 734 and one or more destruction devices 736 that are located or associated with a data storage center, via the network 708, as described herein. The storage devices 734 may include magnetic storage devices and flash media storage devices or flash memory devices (such as solid state drives) that are configured to provide scalable storage capacity for a variety of operations that a customer of the secure destruction service computers 710 may require such as data access requests. The destruction devices 736 may be located in the secure area of the data storage center and be configured to provide information or data signals to the secure destruction service computers 710 that identifies the destruction and sanitization of storage devices associated with the data storage center. In embodiments, the destruction devices 736 may provide information that identifies the presence and destruction of an RFID tag that is associated with the storage device.

Figure 8:
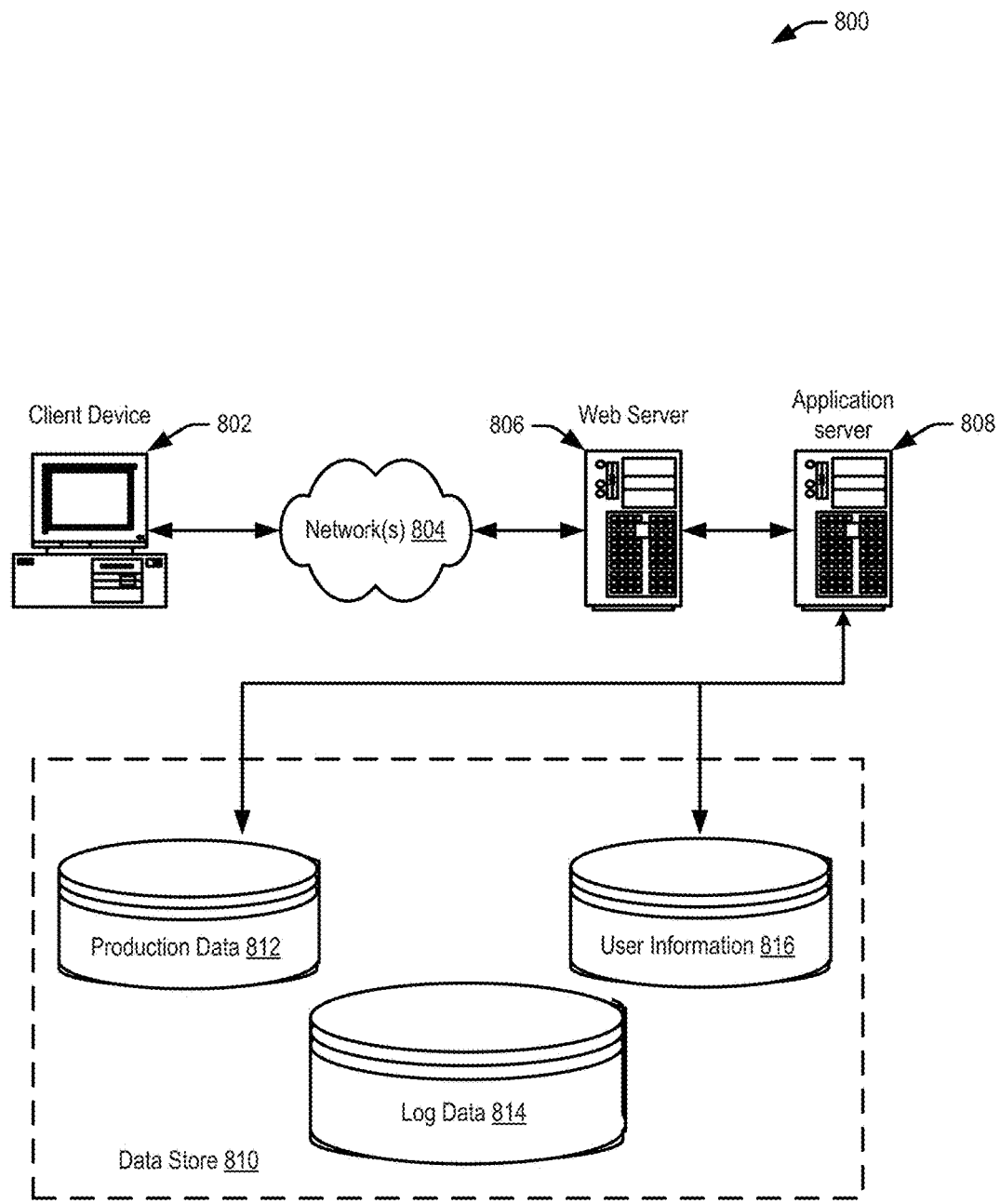
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Javax, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X. Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a computer system, associations between radio frequency identification (RFID) tags and a plurality of storage devices that are in a data storage area, each RFID tag associated with a respective storage device;
   maintaining, by the computer system, metrics that indicate respective conditions for the plurality of storage devices;
   transmitting, by the computer system, to a user device of a technician, an indication that identifies a particular storage device of the plurality of storage devices for destruction, the indication based on the metrics;
   receiving, by the computer system, an indication that the technician has entered a secure area of the data storage area with the particular storage device, the indication that the technician has entered the secure area based on an interaction between an identification (ID) badge of the technician and an ID badge reader at the secure area and based on a location of the particular storage device, the location determined based on the RFID tag associated with the particular storage device;
   transmitting, by the computer system, a first signal to the ID badge reader that prevents the technician from leaving the secure area; and
   in response to receiving, by the computer system, a second signal from a destruction device in the secure area, allowing the technician to leave the secure area, the second signal identifying that the particular storage device is destroyed.

2. The computer-implemented method of claim 1, wherein the metrics include at least one of read and write operation metrics, data access speed metrics, self-diagnosis information, or information that indicates the presence of disabled sectors of the storage device.

3. The computer-implemented method of claim 1, wherein the location is further determined based on the RFID tag providing location information via a wireless access point associated with the data storage area or the secure area.

4. The computer-implemented method of claim 1, wherein the location is further determined using an indoor location system.

5. The computer-implemented method of claim 1, wherein the destruction device is configured to verify the particular storage device and the associated RFID tag prior to destroying the particular storage device and the associated RFID tag.

6. A data storage center comprising:
   a storage room with storage devices, each storage device having a respective identifier tag;
   a secure area with a destruction device for destroying the storage devices;
   an access-control device that enables access to the secure area; and
   a computer system configured to:
      transmit, to a user device, an instruction that identifies a particular storage device of the storage devices for removal from the storage room to the secure area;
      track a location of the particular storage device in the data storage center based on the identifier tag associated with the particular storage device;
      transmit an alarm to the data storage center based on the location of the particular storage device and based on an expiration of a certain time interval; and
      transmit information to the access-control device that prevents a technician from leaving the secure area prior to receiving destruction information from the destruction device that identifies that the particular storage device is destroyed.

7. The data storage center of claim 6, wherein the certain time interval is based on a type of data stored on the particular storage device.

8. The data storage center of claim 6, further comprising an alarm component, the alarm configured to be presented via the alarm component.

9. The data storage center of claim 8, wherein the alarm comprises an audio alarm or visual alarm, and wherein the alarm identifies the location of the particular storage device in the data storage center and the associated identifier tag.

10. The data storage center of claim 6, wherein the computer system is further configured to store a last known location of the particular storage device in the data storage center.

11. The data storage center of claim 6, wherein the computer system is further configured to stop the alarm in the data storage center based on destruction information transmitted by the destruction device.

12. The data storage center of claim 6, wherein the computer system is further configured to stop the alarm based on input provided by an administrator of the data storage center.

13. A non-transitory computer-readable storage medium storing computer-executable instructions that, when executed by a computer system, cause the computer system to perform operations comprising:
   receiving, by a computer system, an indication from an access-control system that a person entered a first area of a storage center;
   determining, by the computer system, a location of a storage device in the storage center based on an identifier tag for the storage device;
   transmitting, by the computer system, a first signal to the access-control system based on the indication and the determined location of the storage device, the first signal causing the access-control system to deny the person permission to leave the first area; and
   transmitting, by the computer system, a second signal to the access-control system based on second information received from a destruction device in the first area, the second signal causing the access-control system to allow the person to leave the secure area, the second information indicating that the storage device is destroyed.

14. The non-transitory computer-readable medium of claim 13, further comprising generating, by the computer system, a time period for the storage device based on an initial location of the storage device within the storage center.

15. The non-transitory computer-readable medium of claim 14, further comprising transmitting, by the computer system, a reminder that indicates a time period remaining of the generated time period.

16. The non-transitory computer-readable medium of claim 13, further comprising transmitting, by the computer system, instructions to a user device to replace the storage device with a new storage device.

17. The non-transitory computer-readable medium of claim 13, further comprising maintaining, by the computer system, status information for a plurality of storage devices in the storage center.

18. The non-transitory computer-readable medium of claim 17, further comprising transmitting, by the computer system, instructions to a user device that identifies the storage device for removal based on the status information.

19. The non-transitory computer-readable medium of claim 13, wherein the identifier tag comprises a radio-frequency identification (RFID) tag, wherein determining the location of the storage device within the storage center is further based on an interaction between a user device and the RFID tag, the user device configured to transmit location information of the RFID tag.

\* \* \* \* \*